Reissued June 8, 1948

Re. 23,005

UNITED STATES PATENT OFFICE 23,005

SEPARATION OF HYDROCARBONS

Moses Robert Lipkin, Philadelphia, Pa., assignor to Sun Oil Company, Philadelphia, Pa., a corporation of New Jersey No Drawing. Original No. 2,398,101, dated April 9, 1946, Serial No. 501,280, September 4, 1943. Application for reissue April 10, 1948, Serial No. 20,376

4 Claims. (Cl. 260—674)

This invention relates to the separation of hydrocarbons according to chemical type by selective adsorption and particularly concerns the separation of aromatics from other hydrocarbons. More particularly, the invention is directed to a process wherein aromatic constituents of hydrocarbon mixtures boiling within the range of gasoline and kerosene are removed by adsorption on a granular adsorbent material, and the adsorbed aromatics are recovered and the adsorbent material simultaneously regenerated for further use by a novel desorption step.

The invention has utility in the preparation of an aromatic concentrate suitable for special use, for instance, as blending material of high antiknock quality for aviation gasoline, as well as in the preparation of products of low aromatic content, for instance kerosene, and is especially useful in large-scale operations of such types. The invention is applicable to treatment of hydrocarbon mixtures derived from petroleum, coal, lignite, shale oil, pitches, tars and the like and which boil within the boiling range of gasoline and kerosene.

It is known that a complex hydrocarbon mixture such as the gasoline and kerosene fractions of petroleum may be separated to an extent according to hydrocarbon type by selective adsorption on certain granular adsorbent materials and it is well recognized that silica gel is one of the most efficient adsorbents for such separation. It is generally recognized that the adsorptive affinity of silica gel and like adsorbents for the various constituents of gasoline varies with the chemical type of adsorbate and in the following decreasing order:

(1) Polar substances (for instance, hydroxy compounds, phenols, ketones, ethers and the corresponding sulfur and nitrogen compounds).
(2) Aromatics.
(3) Olefins.
(4) Naphthenes.
(5) Paraffins.

Thus, of the main hydrocarbon types comprising gasoline or kerosene fractions, aromatics are the most readily adsorbed and methods of effecting the removal of aromatics based on this phenomenon are known to the art. In general these methods comprise contacting a gasoline or kerosene fraction with silica gel by percolation filtration to adsorb aromatics, followed by a desorption step wherein the gel is contacted with a material which is more strongly adsorbed, for instance a polar material such as methanol, acetone or water, and which serves to replace the aromatics on the gel. The aromatic hydrocarbons thereby are removed from the gel in admixture with excess desorbing agent, from which they may be recovered by distillation, extraction, decantation or the like.

These known methods for removing aromatics have proved to be impractical for large scale operation due to certain inherent disadvantages, and consequently have found utility only as an analytical tool. Accordingly a general belief has been prevalent in the art that straight-run petroleum fractions are unsuitable as a commercial source of aromatics, as illustrated by the article appearing in the Petroleum Refiner, volume 22, pages 95–99, April, 1943, and entitled "Petroleum as a source of the aromatic hydrocarbons" in which the statement is made that "the yield of aromatics from straight-run petroleum fractions is so small that this source is impractical for commercial utilization." One major disadvantage in the heretofore known methods is that the gel, after desorption of the aromatics by contact with a polar desorbing agent, is in an inactivated state due to the presence of adsorbed polar agent, and therefore must be regenerated before reuse. Regeneration usually has been accomplished by steaming the gel and then blowing it with air at a relatively high temperature. This procedure may be satisfactory for laboratory or small-scale operation but is highly undesirable for commercial operation due to the difficulty in periodically heating a commercial quantity of gel to the temperature required for reactivation and subsequently cooling the gel before reuse. In a commercial installation a typical amount of gel required would be, for instance, 20–50 tons, and it is evident that an unreasonable and altogether impractical length of time would be required for effecting the necessary heat transfer throughout such a mass, particularly if conventional equipment is employed. A further disadvantage is that the gel after regeneration according to such known methods is in what may be termed a dry condition (even though it contains chemically bound water), so that when the gel is contacted with the petroleum fraction from which aromatics are to be removed considerable heat is liberated as heat-of-wetting. This again presents the problem of heat transfer with its obvious difficulties in each cycle of operation.

The present invention is directed to a process for separating and recovering aromatics from petroleum fractions or from distillates derived from coal, lignite, shale oil, pitches, tars and like sources wherein the above described disadvantages of the prior art procedures are minimized or eliminated and which, accordingly, has particular utility in large-scale or commercial operation. According to the invention and in contrast to the prior art procedures, removal of adsorbed aromatics and regeneration of the adsorbent material are accomplished in one step which comprises contacting the used adsorbent with a desorbing agent which has a lower capacity for adsorption than aromatic hydrocarbons, rather than with one having a higher adsorption capacity. I have found that adsorbed aromatic hydrocarbons of gasoline or kerosene boiling range may be displaced or desorbed from silica gel by commercially feasible quantities of a hydrocarbon or mixture of hydrocarbons of lower adsorption capacity, and that the adsorbent, after such desorption, will be in a regenerated state and suitable for further use as an adsorbent for aromatics. The present invention therefore removes the necessity for heating the adsorbent to effect reactivation, except at rare intervals as more fully explained hereinafter. Furthermore, since the regenerated adsorbent is in a wetted condition, heat-of-wetting effects are substantially eliminated. As an additional advantage, conventional refinery equipment may be utilized in practicing the invention.

The primary requisite for a suitable desorbing agent for practicing the present invention is that it be less strongly adsorbed by the particular adsorbent employed than aromatic hydrocarbons. In certain embodiments of the invention a further requisite is that the boiling range of the desorbing agent be sufficiently different from that of the aromatics that separation of the desorbing agent from desorbed aromatics may be effected easily; while in certain other embodiments wherein it is desirable to retain the desorbed aromatics in solution with desorbing agent and utilize the mixture for various purposes, such difference in boiling range is not required. A further desirable characteristic of the desorbing agent is stability in the presence of the adsorbent under the conditions employed. Paraffinic and naphthenic hydrocarbons, as well as the olefins which do not polymerize at ordinary temperature in the presence of silica gel, meet these requirements. Low boiling paraffinic and naphthenic hydrocarbons, for example propane, butane, isobutane, pentane, isopentane, cyclopentane, hexanes or the like, or mixtures of such hydrocarbons as, for example, petroleum ether, usually are preferred since these may be separated readily from desorbed aromatics by distillation and generally are available at relatively low cost. Such low boiling hydrocarbons also are preferable since there appears to be some improvement in desorbing capacity as molecular weight of the desorbing agent decreases. However it is within the purview of the invention to use hydrocarbons of the aforesaid types having a boiling range above that of the aromatics in question. Furthermore, in certain embodiments, it is desirable to use a desorbing agent whose boiling range may lie within that of the aromatics. For example, in the preparation of aviation gasoline of high anti-knock quality it often is desirable to use as the desorbing agent an alkylation product consisting predominantly of octanes, such alkylate being one of the ingredients of the aviation gasoline, and to utilize the resulting mixture of alkylate and desorbed aromatics directly as blending stock, thus dispensing with the step of separating aromatics from desorbing agent. In addition to the aforementioned hydrocarbon types it is permissible for the desorbing agent to contain aromatics, provided their concentration is not too high, as more fully explained below.

Adsorption is known to be an equilibrium phenomenon. For instance, from a mixture consisting of aromatic, naphthenic and paraffinic hydrocarbons all three types of constituents will be adsorbed by silica gel and the amount of any one type adsorbed will depend on its concentration as well as on the affinity of the gel for that particular type of hydrocarbon. Since the amount of a given constituent, for example an aromatic hydrocarbon, adsorbed by the gel at equilibrium is a function of concentration, it is evident that a gel in equilibrium with a mixture containing say 10 per cent aromatics when brought into contact with a second mixture containing say 5 per cent aromatics will not be able to retain all of the aromatics which have been adsorbed and that desorption of the aromatics therefore will occur until a new equilibrium has been established. Since this second mixture is analogous to the desorbing agent of the present invention, it will be seen that the invention may be practiced with a desorbing agent containing some aromatics. Theoretically the maximum allowable concentration of aromatics in the desorbing agent in order to effect a recovery of aromatics in accordance with the invention would be approximately just less than the aromatic concentration of the gasoline or kerosene charge stock, with some variation in maximum depending on the types of aromatic and non-aromatic constituents in both the charge stock and the desorbing agent, but for practical purposes the desorbing agent obviously should contain as small a proportion of aromatics as possible and preferably none.

In one preferred method of practicing the invention percolation filtration, as commonly employed in the refining of liquids with adsorbent materials, is used in both the adsorption and desorption steps. Aromatic-containing charge stock such as a straight-run gasoline is passed in the usual manner and at ordinary filtration rate through a tower or filter drum charged with activated silica gel. In the case where fresh gel is used, aromatics will be completely removed so that the first filtrate leaving the filter will be aromatic-free. As operation is continued, equilibrium between the aromatic concentration on the gel and the aromatic concentration of the charge stock will be established. This occurs first in a zone near the charge inlet and progressively spreads from inlet to outlet, with a relatively sharp line of demarcation between gel at equilibrium and aromatic-free gel, until the whole mass of gel finally has reached equilibrium and continuation of operation causes no further reduction in aromatic content of the charge. Before complete equilibrium is attained, it is preferable to discontinue the charge stream; otherwise the hold-up liquid in the filter would not show a reduction of aromatic content after removal from the filter, with the result that a lower yield of aromatics per unit volume of charge stock would obtain. The optimum throughput per unit amount of silica gel will depend to an extent on the particular charge stock being treated. For a straight-run gasoline containing approximately 7 per cent aromatics the optimum throughput has been found to be about 450–500 gallons of charge stock per ton of silica gel.

After the desired throughput of charge has been reached, the gel is ready for reactivation by desorption. Flow of charge stock is discontinued and desorbing agent of the type described above, for example petroleum ether, is passed into the filter, thereby forcing out the charge liquid held within the interstices of the gel. The first portion of desorbing agent appearing at the filter outlet contains paraffinic and naphthenic hydrocarbons in relatively large proportion since these are desorbed most readily, as well as some aromatics, and preferably is collected separately from the main portion of desorbing agent in order to minimize contamination of the final aromatic product. It usually is desirable simply to run this first portion into the same receiving tank as the filtered gasoline, since it is useful gasoline stock, although, if desired, it may be collected separately and distilled in order to recover contained desorbing agent and desorbed hydrocarbons. The main portion of desorbing agent leaving the filter contains a major amount of the aromatics adsorbed from the charge stock and is collected separately. As the addition of desorbing agent is continued, the amount of aromatics desorbed per unit of throughput progressively drops as the concentration on the gel is reduced and eventually reaches a point where further desorption becomes impractical. The optimum throughput of desorbing agent is subject to wide variation, and is determined by an economic balance relating yield of aromatics to cost of recovering desorbing agent or, in cases where the mixture of aromatics and desorbing agent is used directly as blending stock, by the particular concentration of aromatics desired in the mixture. In the treatment of straight-run gasolines a usual amount of desorbing agent used is roughly twice the optimum throughput of charge stock. After the desired throughput of desorbing agent has been reached, the desorption operation is discontinued, the gel then being in a reactivated condition and ready for a new cycle of operation.

Since complete removal of aromatics from the gel is not effected in the desorption step, it is evident that in the second and subsequent cycles of operation the filtered charge stock will contain some aromatics, specifically, in such concentration as is in equilibrium with aromatics remaining on the gel after desorption. Thus, except during the initial cycle of operation, complete removal of the aromatic content of the charge stock is not effected; however, with proper operating conditions, only a minor and substantially inconsequential proportion of aromatics will remain in the filtered stock.

Although adsorption of aromatics on silica gel or like adsorbents is aided by low temperature while desorption is facilitated by high temperature, it is preferable in practicing the process described above to make no attempt to vary the operating temperature during a cycle in order to effect conditions alternately favoring adsorption and desorption, due to the aforementioned difficulties accompanying heat transfer throughout a large mass of gel and since such variation is not necessary for successful operation. Preferably both the charge stock and desorbing agent are used at the temperature at which they are available, for instance at ordinary storage tank temperatures such as 10–40° C., and the temperature of the adsorbent is allowed to vary at will.

For an adsorption process employing silica gel to be commercially successful it is necessary that the gel be capable of use through many cycles of operation due to the large cost of replacement. In practicing the above described process it has been found that the gel gradually loses its adsorptive capacity due to the presence of polar substances in the charge stock, for instance sulfur compounds or phenols, which are strongly adsorbed by the gel and are not removed to a substantial extent by the mild desorbing agents of this invention. On continued operation the activity of the gel eventually will drop to a level at which further operation is uneconomic, the rate of degradation of gel activity depending on the amount of polar substances present in the charge stock. With charge stocks such as straight-run gasolines from Gulf Coastal crudes this usually happens after about 100 cycles of operation. It has been found that the gel activity may be brought back to its original level by one regeneration of a type more severe than normally employed and that the gel will then have substantially the same lasting quality as fresh gel. This more severe regeneration may comprise passing through the gel a highly polar material, for example methanol, in order to desorb said polar substances, followed by blowing the gel at an elevated temperature, preferably above 100° C. and suitably about 150° C., with air in order to remove the adsorbed methanol; or, as a more preferable procedure, the regeneration may comprise steaming the gel and then blowing with hot air to remove the adsorbed water. Either method effects complete recovery of gel activity, after which normal operation in accordance with the invention may be resumed. A still further method, which is applicable only when the adsorbed polar substances are sufficiently vaporizable, comprises the single step of blowing the gel at elevated temperature, for instance 150° C. or higher, with an inert gas such as nitrogen, carbon dioxide or flue gas to effect removal of said substances by evaporation alone. Complete regeneration of the gel by methods outlined above and at suitable intervals, such as after each 100 cycles of operation when processing Gulf Coastal straight-run gasoline, permits any given batch of gel to be used for a very extensive period and thus assures commercially successful application of the invention.

In order not to require complete regeneration of the gel at too frequent intervals it may be desirable to subject the charge stock to a pretreatment designed to remove polar compounds, for instance to treatment with alkali, particularly when the charge stock contains a relatively large proportion of polar materials.

The following examples are illustrative of the invention and are given merely as illustrations and not as limitations thereof.

*Example I*

A contact tower containing one ton of 28–200 mesh silica gel is used in a cyclic operation wherein an East Texas straight-run gasoline fraction, having an A. S. T. M. boiling range of 131–320° F. and containing 7.5 per cent aromatics, and pentane are alternately percolated therethrough to effect alternate adsorption and desorption of the aromatics. In each cycle of operation during the first 18 cycles, 480 gallons of the East Texas gasoline and 960 gallons of the pentane are charged and the effluent stream is cut into two fractions comprising 648 gallons of a mixture of treated gasoline and pentane and 792 gallons of a pentane solution of hydrocarbons desorbed from the gel. After 18 cycles the amounts of gasoline and pentane are decreased gradually to compensate for a gradual decline in gel activity due to accumulation of polar compounds, until, after about 100 cycles, the amounts of gasoline and pentane being charged per cycle are in the order of 380 and 760 gallons, respectively. The tower then is drained of its fluid contents, thoroughly steamed to desorb and drive out accumulated polar compounds and then blown with air at a temperature of about 150° C. for sufficient time to remove adsorbed water and restore the original activity of the gel. Cyclic operation then is resumed.

The treated gasoline-pentane mixture resulting from the above described operation contains approximately 2 per cent aromatics and may be used directly as motor fuel stock or may be subjected to distillation for recovery of the pentane. It is worthy of note that substantially all foul-smelling substances have been removed from the gasoline.

The pentane solution of desorbed hydrocarbons is distilled to recover pentane and yield an aromatic-rich residue fraction. Approximately 23 gallons of aromatic fraction having the following composition are obtained for each 480 gallons of gasoline charged:

| | Per cent |
|---|---|
| Saturated hydrocarbons | 12 |
| Benzene | 5 |
| Toluene | 20 |
| Xylenes | 40 |
| Heavier aromatics (mostly $C_9$) | 23 |

This fraction represents approximately 65 per cent of the total aromatic content of the original gasoline and has a purity of 88 per cent with respect to aromatics. The fraction has an I. M. E. P. blending value of about 325, this referring to the indicated mean effective pressure for the standard AFD–3C supercharged knock testing engine (generally designated as CRC–F4), and therefore is particularly valuable as blending stock for high-grade aviation gasoline. It is possible to obtain higher recovery and greater purity of aromatics than shown in the present example by suitable adjustment of the amounts of charge stock and pentane used in each cycle of operation and by cutting the efflux stream into proper fractions.

*Example II*

The present example illustrates how a desorbing agent which boils above the boiling range of the aromatic-containing charge stock may be utilized in practicing the present invention. In this example the desorbing agent is a commercial heavy alkylate having an A. S. T. M. boiling range of 300–500° F. and comprising mainly saturated hydrocarbons with an average of about 12 carbon atoms and ranging in molecular weight from about 140 to 200. This alkylate also contains approximately 1 per cent of high boiling aromatic hydrocarbons.

Three thousand cc. of Gulf Coastal straight-run gasoline having an A. S. T. M. end boiling point of 300° F. and containing 9 per cent aromatic hydrocarbons are allowed to filter by gravity through 1,640 grams of silica gel which previously has been wetted with the aforesaid desorbing agent. After the last of the charge stock has passed into the gel bed, 6,500 cc. of the heavy alkylate are allowed to percolate therethrough. The effluent stream is separated into two fractions, the cut point between fractions being the point at which the gasoline hydrocarbon content of the efflux has dropped to 6 per cent. The first fraction consists of straight-run gasoline of low aromatic content and heavy alkylate, and may be distilled if desired to recover the gasoline and the alkylate separately as overhead and residue fractions, respectively. The second fraction, amounting to 5,140 cc. and comprising alkylate and hydrocarbons desorbed from the gel, is distilled under relatively poor fractionating conditions to recover desorbed aromatic hydrocarbons as an overhead fraction, the distillation being stopped at a vapor temperature of 320° F., whereby there is obtained 254 cc. of an aromatic-rich distillate. The resulting residue fraction contains about 1 per cent aromatic hydrocarbons and may be re-used as desorbing agent in a subsequent cycle of operation. A further distillation of the aromatic-rich distillate under conditions effecting better fractionation than before, with cessation of distillation at a vapor temperature of 324° F., yields 189 cc. of overhead fraction containing 86 per cent aromatics and representing approximately 60 per cent of the aromatic content of the original charge and 65 cc. of bottoms material containing only 1 per cent aromatics. A higher yield of aromatics than shown in this example may be obtained by using a larger volume of desorbing agent.

I claim as my invention:

1. A cyclic process for separating aromatic hydrocarbons from a hydrocarbon mixture containing aromatic and non-aromatic hydrocarbons and boiling within the boiling range of gasoline and kerosene which comprises treating said mixture in liquid phase with silica gel to preferentially adsorb aromatic hydrocarbons therefrom and to yield a liquid of lowered aromatic content, then washing the used adsorbent, at ordinary temperature and without heating, with an essentially non-aromatic hydrocarbon liquid other than said liquid of lowered aromatic content, in sufficient amount to substantially desorb the aromatic hydrocarbons and to simultaneously reactivate the adsorbent for re-use, said essentially non-aromatic hydrocarbon liquid being stable in the presence of said adsorbent under the prevailing operating conditions and being the sole desorbing agent employed, withdrawing from the adsorbent a liquid mixture of desorbing agent and aromatics, and then, while the adsorbent is still wet with desorbing agent, directly re-using the adsorbent for further separation of aromatics in the manner specified.

2. A process as defined in claim 1 wherein the desorbing agent is a saturated hydrocarbon material.

3. A cyclic process for separating aromatic hydrocarbons from a hydrocarbon mixture containing aromatic and non-aromatic hydrocarbons and boiling within the boiling range of gasoline and kerosene which comprises percolating said mixture in liquid phase through slica gel to preferentially adsorb aromatic hydrocarbons therefrom and to yield a liquid of lowered aromatic content, then percolating through the used adsorbent, at ordinary temperature and without heating, with an essentially non-aromatic hydrocarbon liquid other than said liquid of lowered aromatic content, in sufficient amount to substantially desorb the aromatic hydrocarbons and to simultaneously reactivate the adsorbent for re-use, said essentially non-aromatic hydrocarbon liquid being stable in the presence of said adsorbent under the prevailing operating conditions and being the sole desorbing agent employed, withdrawing from the adsorbent a liquid mixture of desorbing agent and aromatics, and then, while the adsorbent is still wet with desorbing agent, directly re-using the adsorbent for further separation of aromatics in the manner specified.

4. A process as defined in claim 3 wherein the desorbing agent is a saturated hydrocarbon material.

MOSES ROBERT LIPKIN.